Aug. 19, 1947.     K. S. WYATT     2,425,851
GAS FILLED CABLE
Filed March 10, 1945

15 - PAPER & METAL TAPES
14 - LEAD SHEATH
13 - IMPREGNATED PAPER
12 - SPIRAL TUBE
11 - HOLLOW CONDUCTOR
16 - GAS TUBE

INVENTOR
KENNETH SAPWELL WYATT
BY
ATTORNEY

Patented Aug. 19, 1947

2,425,851

UNITED STATES PATENT OFFICE 2,425,851

GAS FILLED CABLE

Kenneth Sapwell Wyatt, Bronxville, N. Y., assignor to Phelps Dodge Copper Products Corporation, Dover, Del., a corporation of Delaware Application March 10, 1945, Serial No. 582,028

3 Claims. (Cl. 174—15)

This invention relates to improvements in electric cables of the single conductor type and more particularly to improvements to the gas filled cable.

Such cables usually consist of a stranded copper conductor insulated with oil-impregnated paper and protected against soil water, etc., by a lead sheath. More recently the demand for underground cables at still higher voltages has led to the use of oil-filled cables in which oil is supplied to the insulation through a duct in the conductor from reservoirs at the joints, the oil being under pressures usually not higher than 15 lbs. Still more recently the oil-impregnated paper insulation has been filled with nitrogen gas under pressures low, medium, or high. In the three conductor cable the gas is usually supplied through the filler spaces in which a copper tube is often included to by-pass any oil slugs between joints, the copper tubes opening into a free space at each joint. In single conductor gas-filled cable, it is customary to supply the gas at the outside of the insulation by making gas channels in the lead sheath by means of flutings: or by using a copper tape over the insulation with buttons on it which act as spacers for the lead sheath, thus providing an annular gas channel. In still another type of gas-filled cable, the gas channel is provided by using concentric instead of compact stranded conductor, and also by building up the insulation wall of paper pre-impregnated with an oil or a wax compound which does not drain into the butt spaces even at the maximum operating temperature of the cable in other words, the butt spaces in the insulation and the interstrand spaces of the conductor serve as the gas channel.

Where high gas pressures are used, such as 100 to 200 lbs. per sq. in., and where a lead sheath is used to contain this pressure for service in ducts, and not as buried cable, the lead sheath must be reinforced; but even with the best reinforcement, the lead sheath for this severe service may crack if it has longitudinal gas channel flutings on its inner surface, or if it is not supported on its inside surface by tight contact with the insulated cable within. The latter is particularly true where such a cable is flexed at manholes due to movements of expansion and contraction. This eliminates the possibility of feeding in the gas between the lead sheath and the outer surface of the insulation.

One of the objects of this invention is to remove all these difficulties. We must therefore resort to feeding the gas into the the cable via a duct in the center of a stranded conductor, similar to that used in feeding an oil into an oil-filled cable. However, since the profile of any cable line is sure to show many dips or low points, oil is apt to drain out of the insulation (assuming that we use a mass impregnated cable) and block the duct. Thus, if the gas feed is located at one terminal of the line, there will be continuous pressure drop along the line. Furthermore, in case of a leak due to a rupture in the lead sheath, much time would be required before the pressure drop would communicate itself to the station end.

The obvious way to overcome this difficulty of pressure drop due to oil slugs blocking the duct in the conductor at dips in the line would be by thoroughly draining the cable after mass impregnation. However, in actual practice one can never be certain that in the operating cable further drainage will not occur on load cycles, thus filling up the center gas feed duct at dips in the line.

In order to bypass this blocking of the centrally located gas tube in the hollow cable, I propose to utilize a gas tight through tube somewhat smaller than the centrally located gas tube with spirally open wall, running throughout the length of the cable. This tube is to be provided with connectors at the cable joints having relief valves so that the gas pressure may enter the centrally located gas tubes on either side of the blocked line thereby communicating the gas pressure to the insulation throughout the length of the cable, at the same time prevent any oil present in the hollow of the conductor from flowing into the gas line.

The foregoing and other features of my invention will now be described in connection with the accompanying drawing forming part of this specification in which I have represented my gas filled cable in its preferred form after which I shall point out in the claims those features which I believe to be new and of my own invention.

Figure 1:
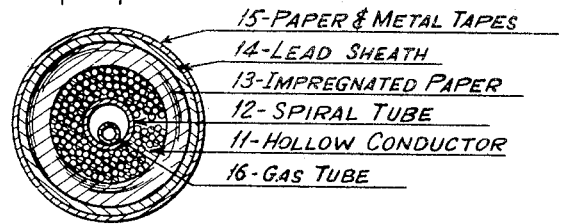
Figure 1 is a cross-section of my cable in its preferred form.

In the carrying out of my invention a preferred form of construction for a high voltage gas filled cable I employ a stranded conductor 11, said strands laid helically over a spiral open tube 12 forming a local gas duct. Over the conductor I apply paper insulation 13, mass impregnated and preferably drained. A lead sheath 14 is over the insulation reinforced by paper and/or metal tapes is sufficient to carry the gas pressure within. It may provide common protection 31 over all. Inside the open tube 12 I provide a gas tight tube 16, connected to a gas supply (not shown), smaller in diameter than the duct formed of the tube 12. At intervals throughout the length of the tube 16 I provide a connector 25 having a relief valve 26 adapted to permit the gas pressure that is supplied to the tube 16 to flow out into the tube 12 but which is so constructed that oil in the tube 12 cannot flow into and block the tube 16, the tube 16, being connected to source of gas pressure at convenient points in the line.

Figure 2:
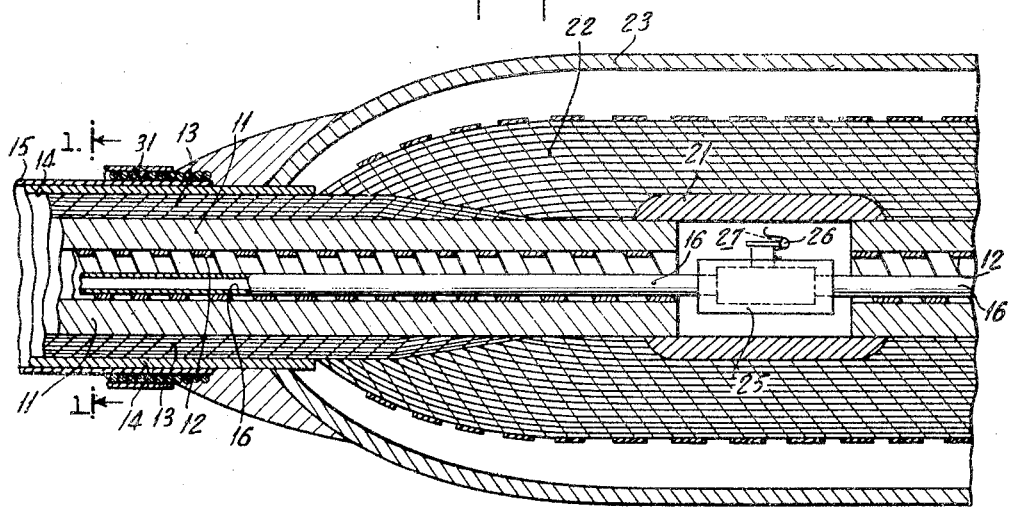
Figure 2 is a longitudinal section through one of the joints showing the pressure valve which maintains pressure throughout the cable.

In Figure 2 I show a longitudinal section through a spliced joint in a cable line. In the construction shown the ends of the conductor 11 are joined by a typical connector 21 which is provided with central space 27 to accommodate the connector 25 and permit the operation of the valve 26.

The main feature of this invention is a continuous gas tight line supplied with valves 26 so spaced that any blocking of the centrally located gas line of the cable at any point in its length, will be bypassed and gas can be supplied to the insulation on either side of the block in the line.

At the joint of a cable the conductor may be connected in usual manner by a copper connector 21 the usual joint insulation 22 is applied, all covered with a brass or bronze sleeve 23. Inside the connector the through gas tube 16 may be connected by a fitting 25 provided with a valve 26.

The advantages I claim from the present invention are the ability to maintain the gas pressure throughout the cable system at fairly uniform values and to get around pressure drops due to oil slugs blocking the duct within the conductor at dips in the line. By thus making it possible to feed the gas satisfactorily into the conductor I thereby make it possible to build a cable with an improved reinforced lead sheath, since the lead sheath is not weakened by flutings on its inner surface and may now be supported by putting it in close contact with the insulation. The only precaution necessary is to charge the line originally very slowly with the nitrogen or other gas employed, so as to permit the gas to dissolve slowly in the insulation before the pressure is raised suddenly, possibly causing mechanical damage.

I wish it distinctly understood that my improved gas filled cable illustrated and described is in the form in which I desire to construct it and that changes or variations may be made as might be convenient or desirable without departing from the salient features of my invention and I therefore intend the following claims to cover such modifications as naturally fall within the lines of invention.

I claim:

1. A gas filled cable comprising a stranded hollow conductor insulated with impregnated paper and enclosed in a reinforced lead sheath, a gas tight tube containing gas under pressure within the hollow of the conductor, one way relief valves located in the gas tight tube spaced throughout the length of the cable and communicating with the hollow of the conductor.

2. A gas filled cable comprising a single stranded insulated hollow conductor, a gas tight tube containing gas under pressure located within the central hollow of the conductor and provided throughout its length with spaced valves opening into the hollow of the conductor.

3. A gas filled cable comprising a stranded hollow conductor insulated with oil impregnated paper and enclosed within a reinforced lead sheath, a gas tight tube containing gas under pressure within the hollow of the conductor, relief valves located in the gas tight tube at spaced intervals, permitting gas to enter the hollow of the conductor and at the same time preventing oil from entering the gas tube.

KENNETH SAPWELL WYATT.

REFERENCES CITED

The following references are of record in the file of this patent:

UNITED STATES PATENTS

| Number | Name | Date |
|---|---|---|
| 2,253,171 | Engster | Aug. 19, 1941 |

FOREIGN PATENTS

| Number | Country | Date |
|---|---|---|
| 663,673 | Germany | Aug. 11, 1938 |